US012713120B2

(12) United States Patent
Kim

(10) Patent No.: US 12,713,120 B2
(45) Date of Patent: Aug. 18, 2026

(54) CAMERA MODULE INCLUDING DAMPER AND ELECTRONIC DEVICE INCLUDING THE SAME

(71) Applicant: Samsung Electronics Co., Ltd., Suwon-si (KR)

(72) Inventor: Beomsoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 18/675,711

(22) Filed: May 28, 2024

(65) Prior Publication Data

US 2025/0016435 A1 Jan. 9, 2025

Related U.S. Application Data

(63) Continuation of application No. PCT/KR2024/003564, filed on Mar. 21, 2024.

(30) Foreign Application Priority Data

Jul. 6, 2023 (KR) ........................ 10-2023-0087522
Sep. 4, 2023 (KR) ........................ 10-2023-0116737

(51) Int. Cl.
*H04N 5/335* (2011.01)
*H04N 23/51* (2023.01)
*H04N 23/55* (2023.01)

(52) U.S. Cl.
CPC ............. *H04N 23/55* (2023.01); *H04N 23/51* (2023.01)

(58) Field of Classification Search
CPC ...................................................... H04N 23/55
See application file for complete search history.

(56) References Cited

U.S. PATENT DOCUMENTS

| | | | |
|---|---|---|---|
| 9,778,481 B2 | 10/2017 | Sato et al. | |
| 10,302,961 B2 | 5/2019 | Miller et al. | |
| 10,715,730 B1 | 7/2020 | Xu et al. | |
| 12,248,239 B2 * | 3/2025 | Park | H04N 23/57 |
| 2013/0050828 A1 | 2/2013 | Sato et al. | |
| 2015/0355477 A1 | 12/2015 | Sato et al. | |
| 2018/0246342 A1 | 8/2018 | Miller et al. | |

(Continued)

FOREIGN PATENT DOCUMENTS

| | | |
|---|---|---|
| KR | 10-2016-0106377 A | 9/2016 |
| KR | 10-2017-0111034 A | 10/2017 |
| KR | 10-1792348 B1 | 11/2017 |

(Continued)

OTHER PUBLICATIONS

International Search Report dated Jun. 28, 2024, issued in International Application No. PCT/KR2024/003564.

*Primary Examiner* — Gary C Vieaux
(74) *Attorney, Agent, or Firm* — Jefferson IP Law, LLP

(57) ABSTRACT

A camera module is provided. The camera module includes a lens having an optical axis, a first structure configured to carry the lens along the optical axis, a second structure, wherein the first structure is configured to move relative to the second structure, an extension extending from any one of the first structure or the second structure, a guide tunnel positioned in the other one of the first structure or the second structure and configured to guide the extension, and a damper configured to damp a movement of the extension in a direction of the optical axis.

20 Claims, 13 Drawing Sheets

(56) References Cited

U.S. PATENT DOCUMENTS

| | | | | |
|---|---|---|---|---|
| 2022/0206246 | A1* | 6/2022 | Hagiwara .............. | G03B 30/00 |
| 2023/0027156 | A1* | 1/2023 | Moon .................. | G02B 27/646 |

FOREIGN PATENT DOCUMENTS

| | | | | | |
|---|---|---|---|---|---|
| KR | 10-2152863 | B1 | | 9/2020 | |
| KR | 20210135980 | A | * | 11/2021 | ............... G03B 5/06 |
| KR | 10-20220015482 | A | | 2/2022 | |
| KR | 10-2022-0163331 | A | | 12/2022 | |
| KR | 10-2023-0034276 | A | | 3/2023 | |
| KR | 10-2505840 | B1 | | 3/2023 | |
| KR | 10-2506545 | B1 | | 3/2023 | |
| KR | 10-2023-0068075 | A | | 5/2023 | |
| KR | 10-2023-0093231 | A | | 6/2023 | |

* cited by examiner

CAMERA MODULE INCLUDING DAMPER AND ELECTRONIC DEVICE INCLUDING THE SAME

CROSS-REFERENCE TO RELATED APPLICATION(S)

This application is a continuation application, claiming priority under § 365 (c), of an International application No. PCT/KR2024/003564, filed on Mar. 21, 2024, which is based on and claims the benefit of a Korean patent application number 10-2023-0087522, filed on Jul. 6, 2023, in the Korean Intellectual Property Office, and of a Korean patent application number 10-2023-0116737, filed on Sep. 4, 2023, in the Korean Intellectual Property Office, the disclosure of each of which is incorporated by reference herein in its entirety.

BACKGROUND

1. Field

The disclosure relates to a camera module and an electronic device. More particularly, the disclosure relates to a camera module including a damper and an electronic device including the same.

2. Description of Related Art

Actuators to move a lens in the direction of an optical axis are being developed to implement autofocus in camera modules. For example, the lens may be driven using a spring, a ball, a shape-memory alloy (SMA) wire, or other arbitrary actuators.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a camera module including a damper and an electronic device including the same.

Additional aspects will be set forth in part in the description which follows and, in part, will be apparent from the description, or may be learned by practice of the presented embodiments.

In accordance with an aspect of the disclosure, a camera module is provided. The camera module includes a lens having an optical axis, a first structure configured to carry the lens along the optical axis, a second structure, wherein the first structure is configured to move relative to the second structure, an extension extending from any one of the first structure or the second structure, a guide tunnel positioned in the other one of the first structure or the second structure and configured to guide the extension, and a damper configured to damp a movement of the extension in a direction of the optical axis.

In accordance with another aspect of the disclosure, an electronic device is provided. The electronic device includes a camera module, wherein the camera module includes a lens having an optical axis, a first structure configured to carry the lens along the optical axis, a second structure, wherein the first structure is configured to move relative to the second structure, an extension extending from any one of the first structure or the second structure, a guide tunnel positioned in the other one of the first structure or the second structure and configured to guide the extension, and a damper configured to damp a movement of the extension in a direction of the optical axis.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
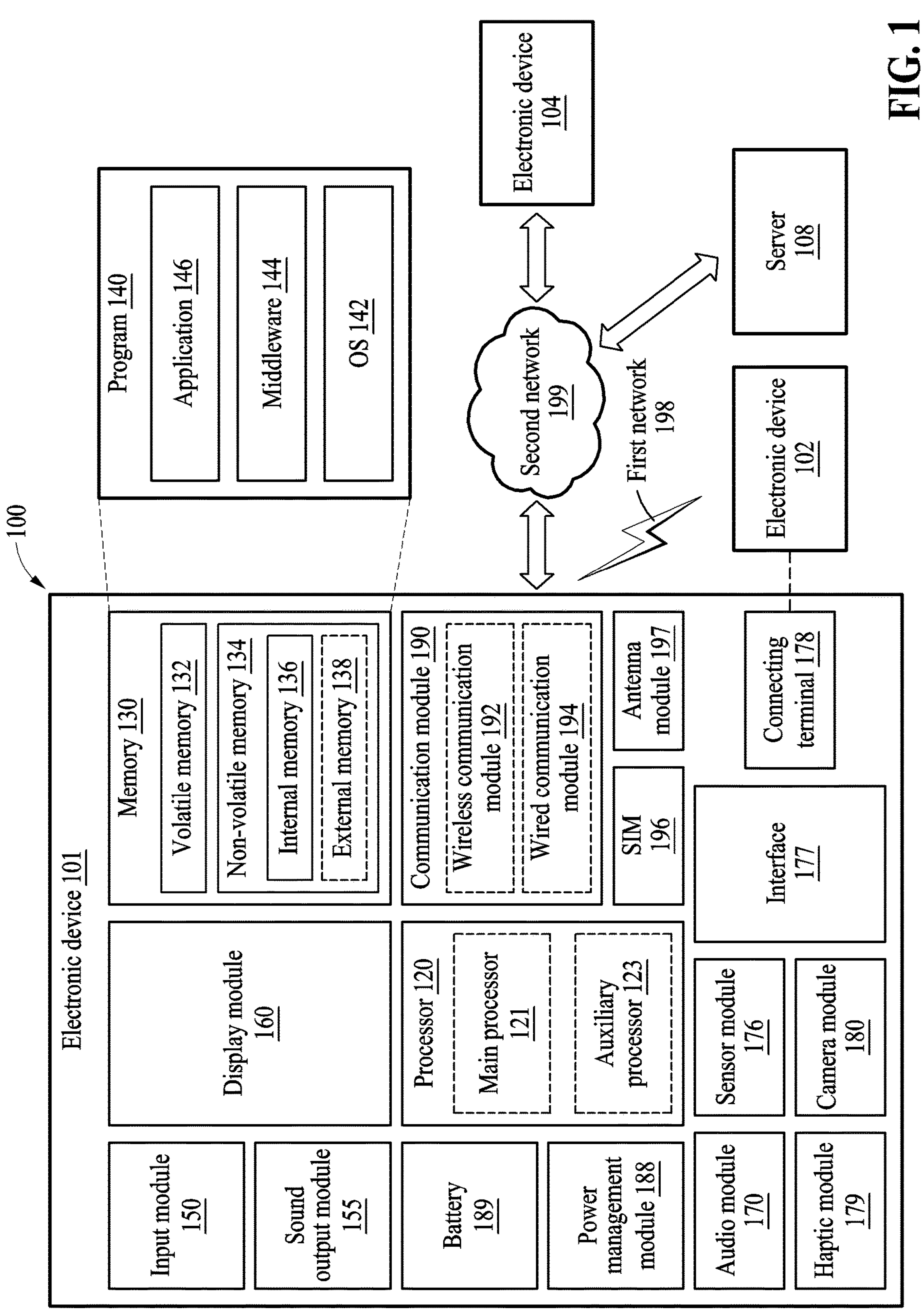
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated through machine learning. Such learning may be performed, e.g., by the electronic device 101 where the artificial intelligence is performed, or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as a portion of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type from, the electronic device 101. According to an embodiment, all or some of operations to be executed by the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to the embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms such as "1$^{st}$," and "2$^{nd}$," or "first" and "second" may be used to simply distinguish a corresponding component from another, and do not limit the components in other aspect (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., wiredly), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
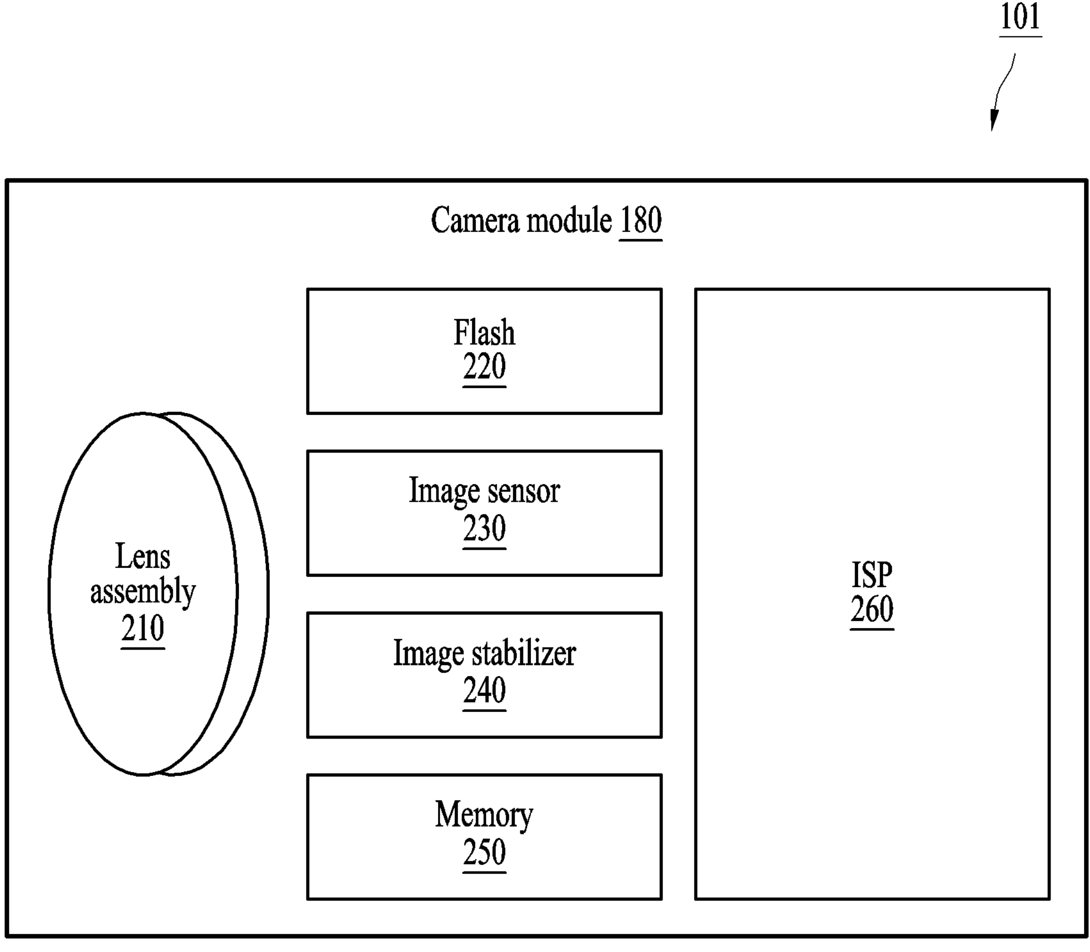
FIG. 2 is a block diagram illustrating a camera module according to an embodiment of the disclosure.

FIG. 2 is a block diagram illustrating a camera module according to an embodiment of the disclosure.

Referring to FIG. 2, the camera module 180 may include a lens assembly 210, a flash 220, an image sensor 230, an image stabilizer 240, memory 250 (e.g., a buffer memory), or an ISP 260. The lens assembly 210 may collect light emitted from an object which is a target of which an image is to be captured. The lens assembly 210 may include one or more lenses. According to an embodiment, the camera module 180 may include a plurality of lens assemblies 210. In this case, the camera module 180 may constitute, for example, a dual camera, a 360-degree camera, or a spherical camera. A portion of the lens assemblies 210 may have the same lens properties (e.g., an angle of view, a focal length, an auto focus, an f number, or an optical zoom), or at least one lens assembly may have one or more lens properties that are different from those of another lens assembly. The lens assembly 210 may include, for example, a wide-angle lens or a telephoto lens.

The flash 220 may emit light to be used to enhance light emitted or reflected from the object. According to an embodiment, the flash 220 may include one or more light emitting diodes (LEDs) (e.g., a red-green-blue (RGB) LED, a white LED, an infrared (IR) LED, or an ultraviolet (UV) LED), or a xenon lamp. The image sensor 230 may obtain an image corresponding to the object by converting light emitted or reflected from the object and transmitted through the lens assembly 210 into an electrical signal. According to an embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 230 may be implemented using, for example, a charged coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic (e.g., adjust the read-out timing) of the image sensor 230, in response to a movement of the camera module 180 or the electronic device 101 including the camera module 180. This may compensate for at least a portion of a negative effect of the movement on an image to be captured. According to an embodiment, the image stabilizer 240 may sense such a movement of the camera module 180 or the electronic device 101 using a gyro sensor (not shown) or an acceleration sensor (not shown) disposed inside or outside the camera module 180. According to an embodiment, the image stabilizer 240 may be implemented as, for example, an optical image stabilizer. The memory 250 may at least temporarily store at least a portion of the image obtained through the image sensor 230 for a subsequent image processing task. For example, when image acquisition is delayed by a shutter or a plurality of images is obtained at a high speed, an obtained original image (e.g., a Bayer-patterned image or a high-resolution image) may be stored in the memory 250, and a copy image (e.g., a low-resolution image) corresponding the original image may be previewed through the display module 160. Subsequently, when a specified condition (e.g., a user input or a system command) is satisfied, at least a portion of the original image stored in the memory 250 may be obtained and processed by, for example, the ISP 260. According to an embodiment, the memory 250 may be configured as at least part of the memory 130 or as a separate memory operated independently of the memory 130.

The ISP 260 may perform one or more image processing operations on the image obtained through the image sensor 230 or the image stored in the memory 250. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening. Additionally or alternatively, the ISP 260 may control at least one of the components (e.g., the image sensor 230) included in the camera module 180 (e.g., control an exposure time, control a read-out timing, or the like). The image processed by the ISP 260 may be stored again in the memory 250 for further processing or may be provided to an external component (e.g., the memory 130, the display module 160, the electronic device 102, the electronic device 104, or the server 108) of the camera module 180. According to an embodiment, the ISP 260 may be configured as at least part of the processor 120 or as a separate processor operated independently of the processor 120. When the ISP 260 is configured as a processor separate from the processor 120, at least one image processed by the ISP 260 may be displayed as it is or be displayed through the display module 160 after additional image processing is performed by the processor 120.

According to an embodiment, the electronic device 101 may include a plurality of camera modules 180 having different properties or functions. In this case, for example, at least one of the plurality of camera modules 180 may be a wide-angle camera, and at least another one of the plurality of camera modules 180 may be a telephoto camera. Similarly, at least one of the plurality of camera modules 180 may be a front camera, and at least another one of the plurality of camera modules 180 may be a rear camera.

Figure 3:
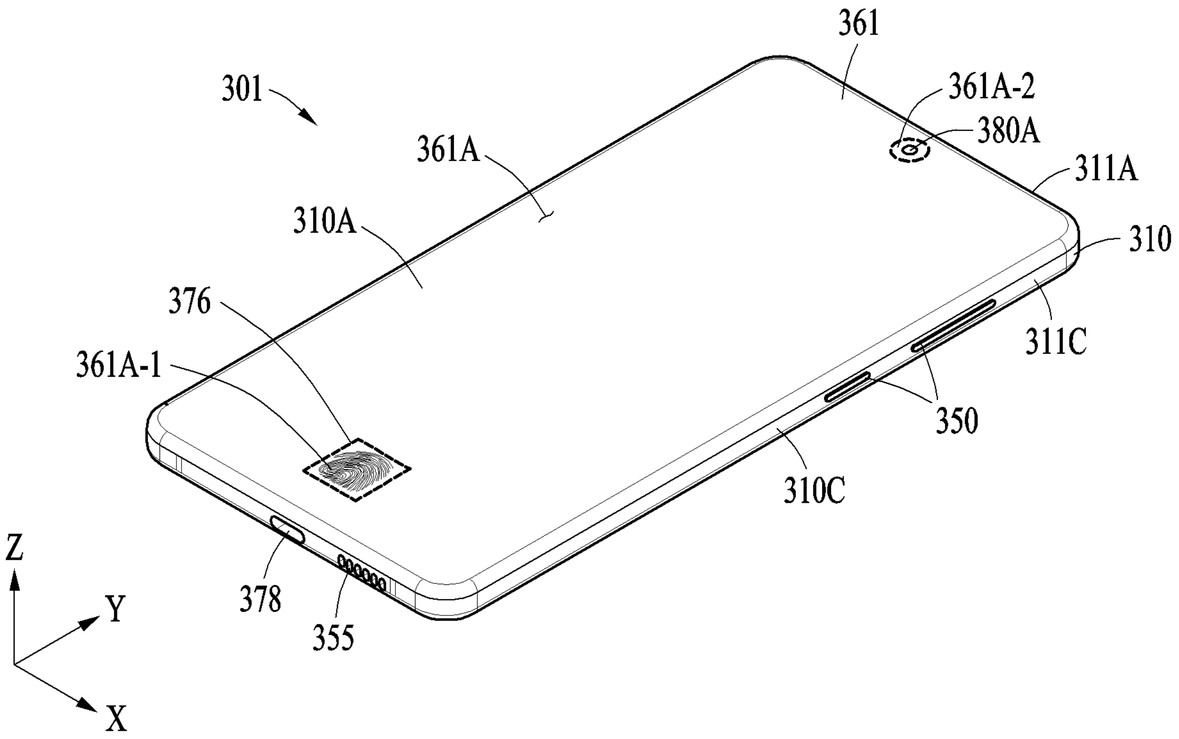
FIG. 3 is a perspective view of an electronic device in one direction according to an embodiment of the disclosure.

FIG. 3 is a perspective view of an electronic device in one direction according to an embodiment of the disclosure.

Figure 4:
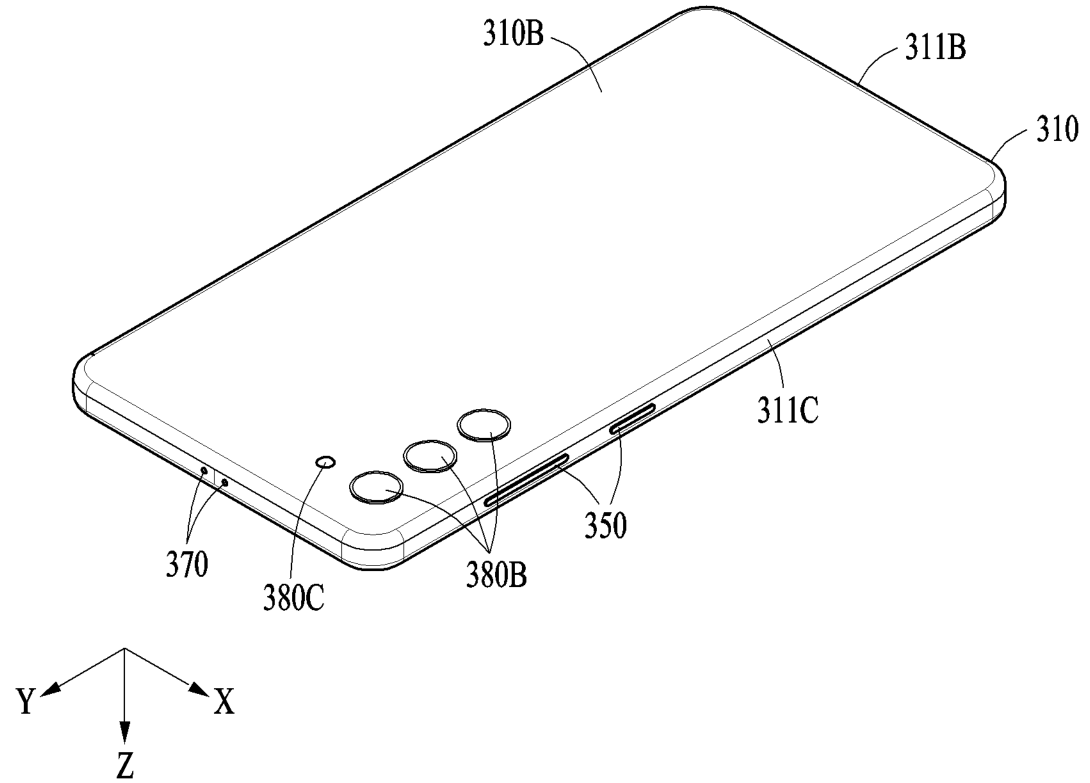
FIG. 4 is a perspective view of an electronic device in another direction according to an embodiment of the disclosure.

FIG. 4 is a perspective view of the electronic device in another direction according to an embodiment of the disclosure.

Referring to FIGS. 3 and 4, an electronic device 301 (e.g., the electronic device 101 of FIG. 1) may include a housing 310 including a first surface 310A (e.g., a front surface), a second surface 310B (e.g., a rear surface), and a third surface 310C (e.g., a side surface) enclosing a space between the first surface 310A and the second surface 310B. The first surface 310A may be formed by a first plate 311A of which at least a portion is substantially transparent. For example, the first plate 311A may include a polymer plate or a glass plate including at least one coating layer. The second surface 310B may be formed by a second plate 311B that is substantially opaque. For example, the second plate 311B may be formed of coated or tinted glass, ceramic, polymer, metal (e.g., aluminum, stainless steel (STS), or magnesium), or a combination thereof. The third surface 310C may be formed by a frame 311C that is coupled to the first plate 311A and the second plate 311B and includes a metal and/or a polymer. The second plate 311B and the frame 311C may be formed monolithically. The second plate 311B and the frame 311C may be formed of substantially the same material (e.g., aluminum).

The electronic device 301 may include an input module 350 (e.g., the input module 150 of FIG. 1). The input module 350 may be positioned on the third surface 310C. The input module 350 may include at least one key input device. For example, the key input device may include one or more mechanical actuators (e.g., buttons), one or more capacitors, and/or one or more inductors.

The electronic device 301 may include a sound output module 355 (e.g., the sound output module 155 of FIG. 1). The sound output module 355 may be positioned on the third surface 310C. The sound output module 355 may include one or more holes.

The electronic device 301 may include a display module 361 (e.g., the display module 160 of FIG. 1). The display module 361 may be positioned on the first surface 310A. The display module 361 may be visible through at least a portion of the first plate 311A. The display module 361 may have a shape that is substantially the same as the shape of an outer edge of the first plate 311A. The periphery of the display module 361 may substantially coincide with the outer edge of the first plate 311A. The display module 361 may include a touch sensing circuit, a pressure sensor for measuring an intensity (pressure) of a touch, and/or a digitizer for detecting a magnetic-type stylus pen. The display module 361 may include a screen display area 361A that is visually exposed to display content using pixels. The screen display area 361A may include a sensing area 361A-1. The sensing area 361A-1 may overlap at least one area of the screen display area 361A. The sensing area 361A-1 may allow transmission of an input signal related to a sensor module 376 (e.g., the sensor module 176 of FIG. 1). The sensing area 361A-1 may display content, like the screen display area 361A that does not overlap the sensing area 361A-1. For example, the sensing area 361A-1 may display the content while the sensor module 376 is not operating. At least a portion of a camera area 361A-2 may overlap the screen display area 361A. The screen display area 361A may include the camera area 361A-2. The camera regions 361A-2 may allow transmission of an optical signal related to a first camera module 380A (e.g., the camera module 180 of FIG. 1 and/or the camera module 180 of FIG. 2). At least a portion of the camera area 361A-2, that overlaps the screen display area 361A, may display content, similarly to the screen display area 361A that does not overlap the camera area 361A-2. For example, the camera area 361A-2 may display the content while the first camera module 380A is not operating.

The electronic device 301 may include an audio module 370 (e.g., the audio module 170 of FIG. 1). The audio module 370 may be positioned on the third surface 310C. The audio module 370 may obtain a sound through at least one hole.

The electronic device 301 may include the sensor module 376. The sensor module 376 may be positioned on the first surface 310A. The sensor module 376 may form the sensing area 361A-1 in at least a portion of the screen display area 361A. The sensor module 376 may receive an input signal transmitted through the sensing area 361A-1 and generate an electrical signal based on the received input signal. For example, the input signal may have a designated physical quantity (e.g., heat, light, temperature, sound, pressure, or ultrasound). The input signal may include a signal related to biometric information (e.g., a fingerprint) of a user.

The electronic device 301 may include a connecting terminal 378 (e.g., the connecting terminal 178 of FIG. 1). The connecting terminal 378 may be positioned on the third surface 310C. For example, when the electronic device 301 is viewed in one direction (e.g., the +Y direction), the connecting terminal 378 may be positioned substantially in a central portion of the third surface 310C, and the sound output module 355 may be positioned on one side (e.g., the right side) with respect to the connecting terminal 378.

The electronic device 301 may include the first camera module 380A (e.g., the camera module 180 of FIG. 1 and/or the camera module 180 of FIG. 2). The first camera module 380A may be positioned on the first surface 310A. At least a portion of the first camera module 380A may be positioned under the display module 361. The first camera module 380A may receive an optical signal transmitted through the camera area 361A-2.

The electronic device 301 may include a plurality of second camera modules 380B (e.g., the camera module 180 of FIG. 1 and/or the camera module 180 of FIG. 2). The plurality of second camera modules 380B may be positioned on the second surface 310B. The plurality of second camera modules 380B may be arranged in one direction (e.g., the Y direction) of the second plate 311B. The plurality of second camera modules 380B may have different fields of view. For example, the plurality of second camera modules 380B may include an ultra wide-angle camera, a wide-angle camera, and/or a tele camera.

The electronic device 301 may include a light module 380C (e.g., the flash 220 of FIG. 2). The light module 380C may be positioned on the second surface 310B. The light module 380C may include one or more light-emitting diodes or xenon lamps. The light module 380C may include a sensor configured to detect external light. For example, the sensor may include a flicker sensor.

Meanwhile, the embodiments set forth herein may also apply to electronic devices of various shapes/forms (e.g., a foldable electronic device, a slidable electronic device, a rollable electronic device, a digital camera, a digital video camera, a tablet PC, a laptop computer, and other electronic devices), in addition to the electronic device shown in FIGS. 3 and 4.

As used herein, the terms "substantially", "approximately", "generally", and "about" in reference to a given parameter, property, or condition may include a degree that one of ordinary skill in the art would understand that the given parameter, property, or condition is met with a small degree of variance, such as within acceptable manufacturing tolerances. For example, a parameter that is substantially met may be at least about 90% met, at least about 95% met, or at least about 99% met.

Figure 5:
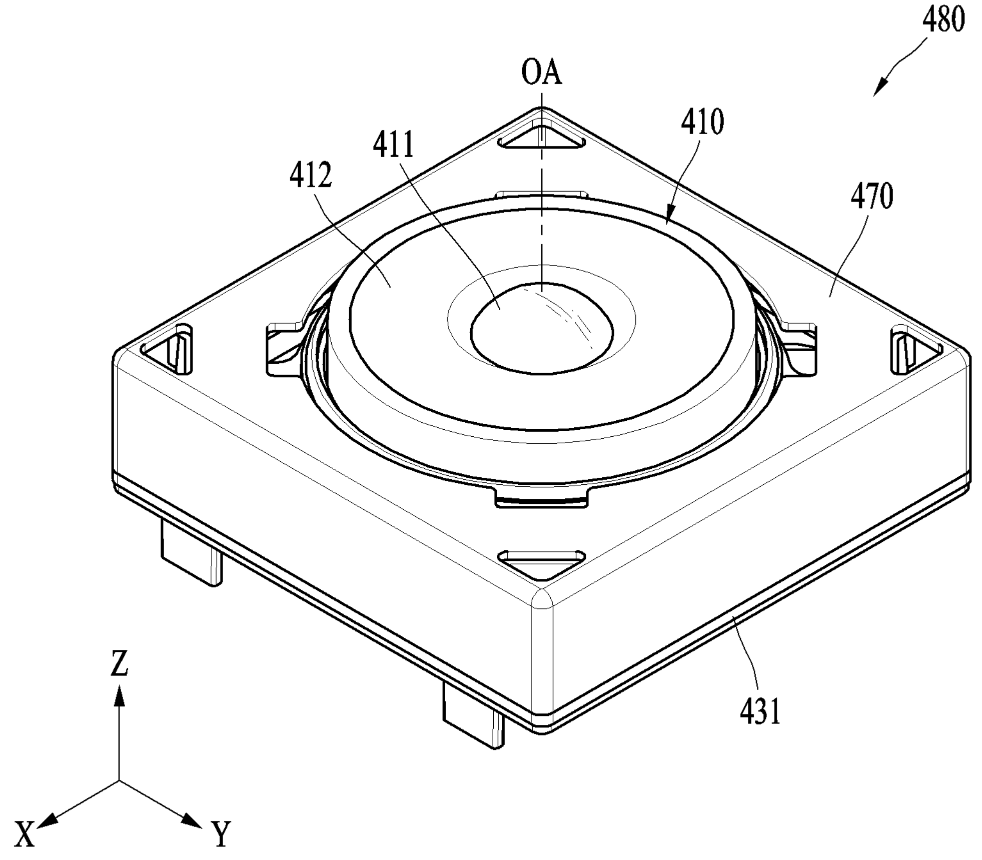
FIG. 5 is a perspective view of a camera module according to an embodiment of the disclosure.

FIG. 5 is a perspective view of a camera module according to an embodiment of the disclosure.

Figure 6:
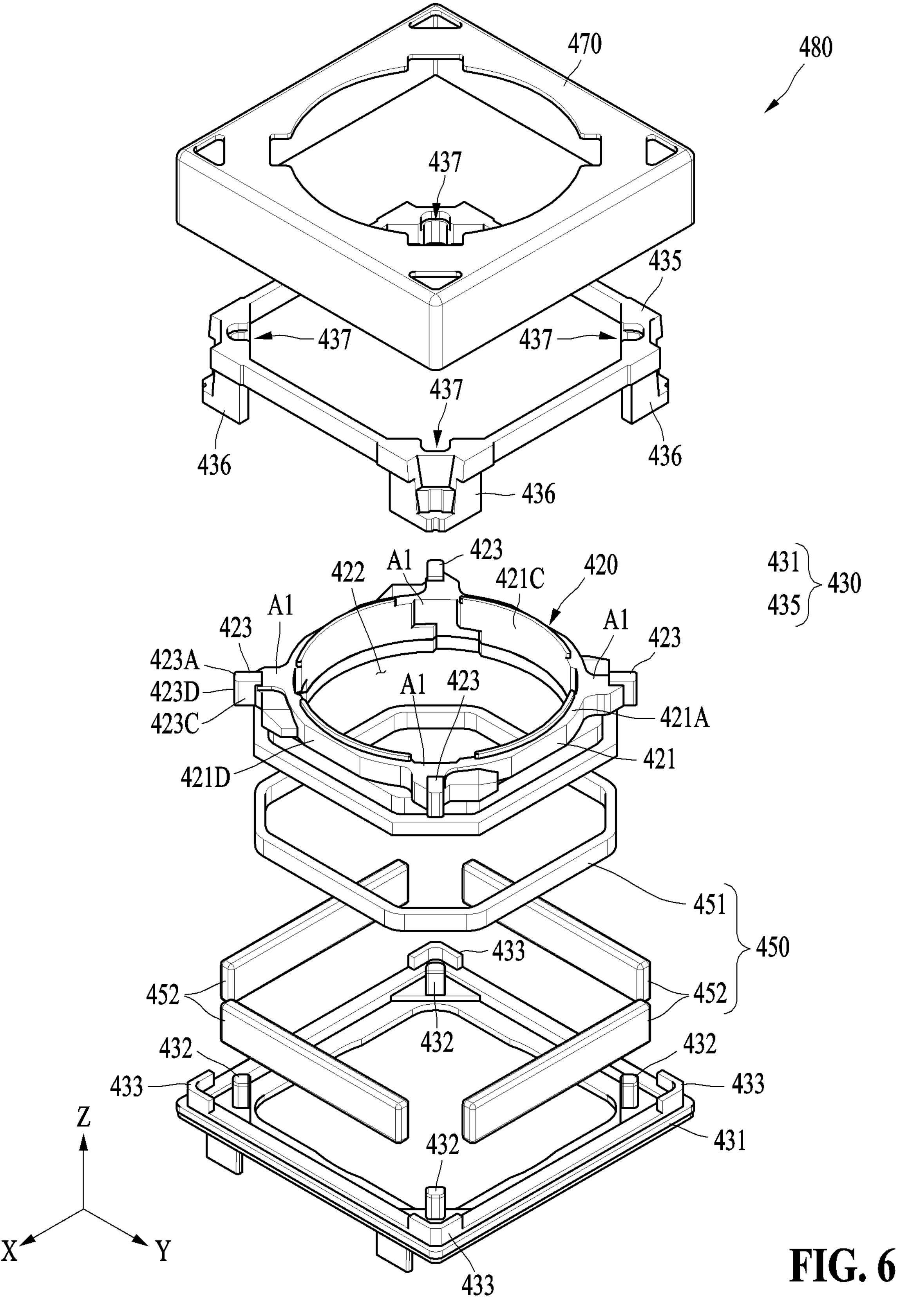
FIG. 6 is an exploded perspective view of a camera module according to an embodiment of the disclosure.

FIG. 6 is an exploded perspective view of the camera module according to an embodiment of the disclosure.

Figure 7:
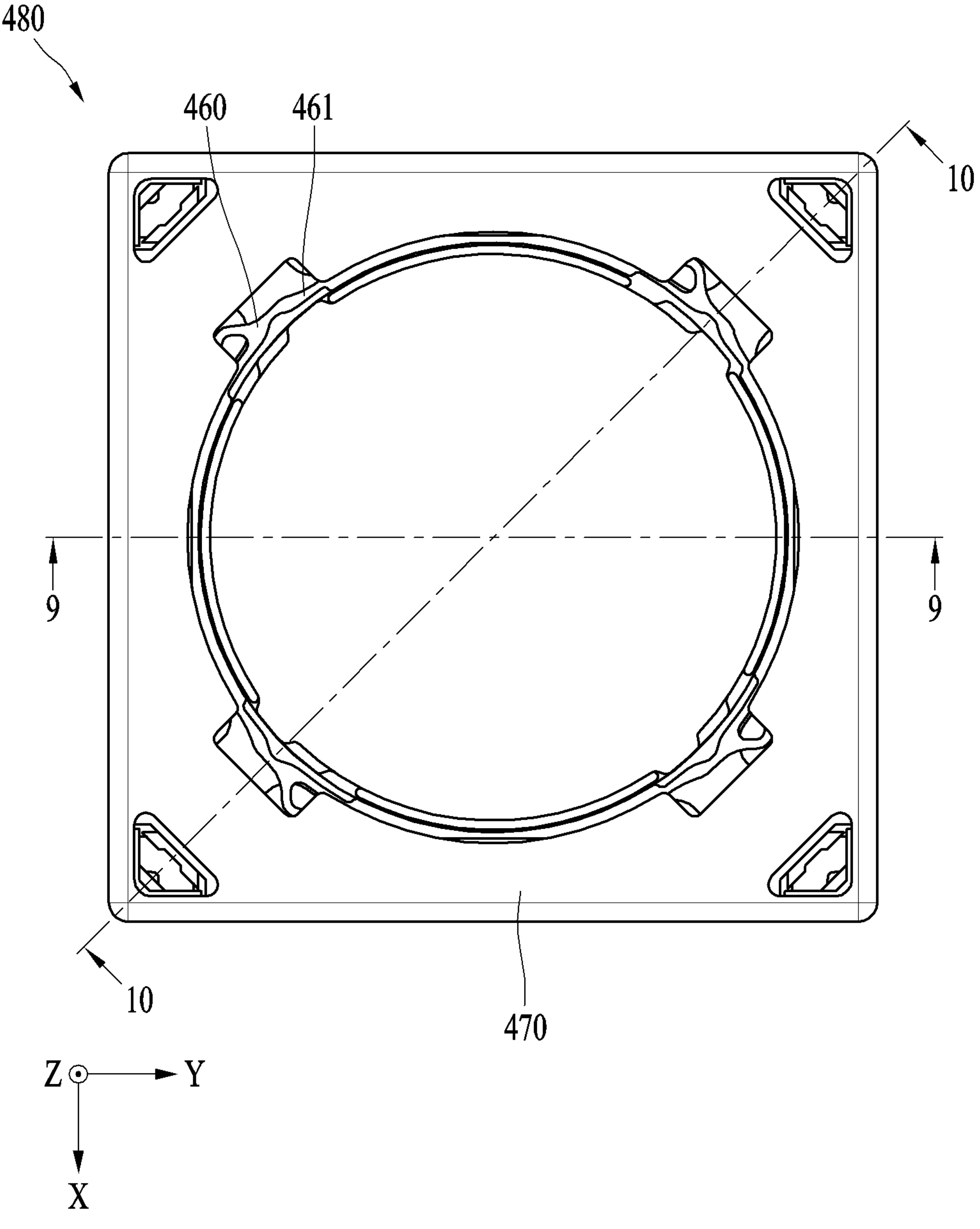
FIG. 7 is a plan view of a camera module according to an embodiment of the disclosure.

FIG. 7 is a plan view of the camera module according to an embodiment of the disclosure.

Figure 8:
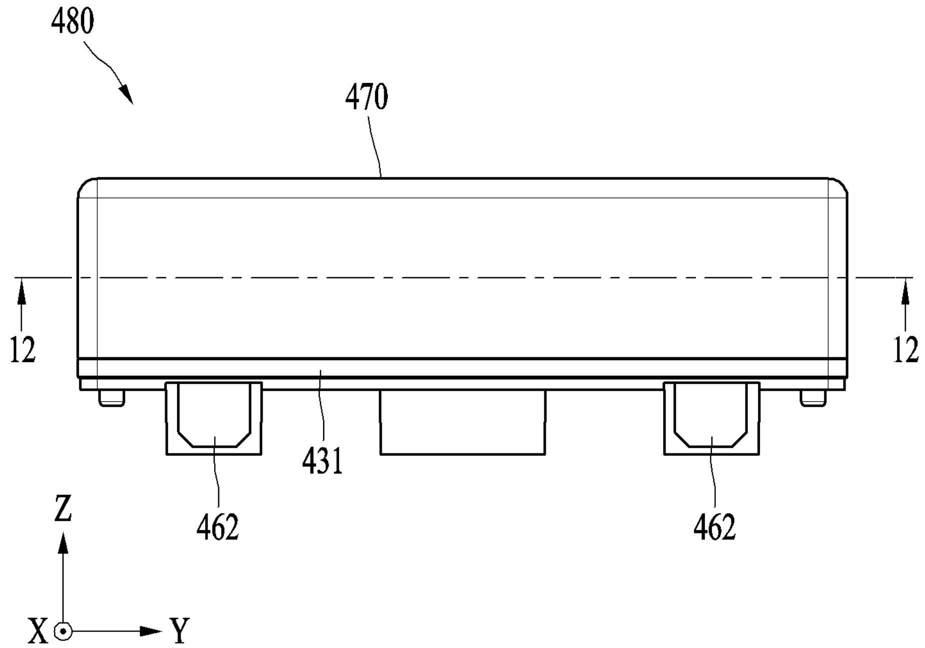
FIG. 8 is a side view of a camera module according to an embodiment of the disclosure.

FIG. 8 is a side view of the camera module according to an embodiment of the disclosure.

Figure 9:
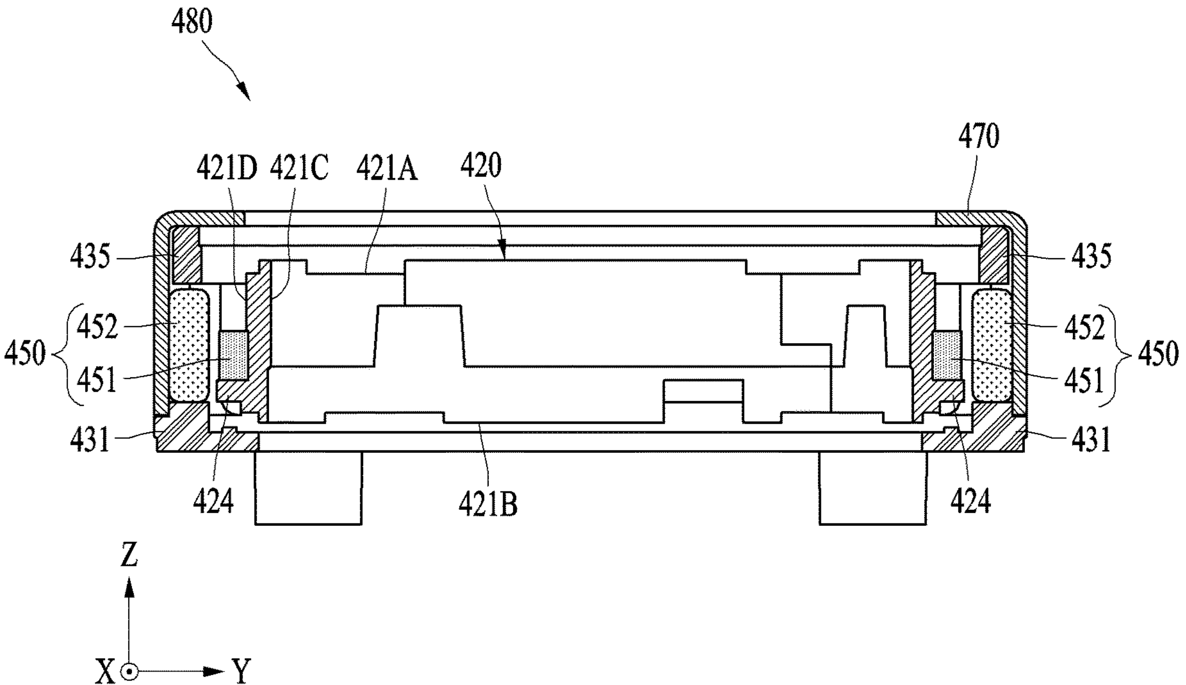
FIG. 9 is a cross-sectional view of the camera module of FIG. 7, taken along a line 9-9 according to an embodiment of the disclosure.

FIG. 9 is a cross-sectional view of the camera module of FIG. 7, taken along a line 9-9 according to an embodiment of the disclosure.

Figure 10:
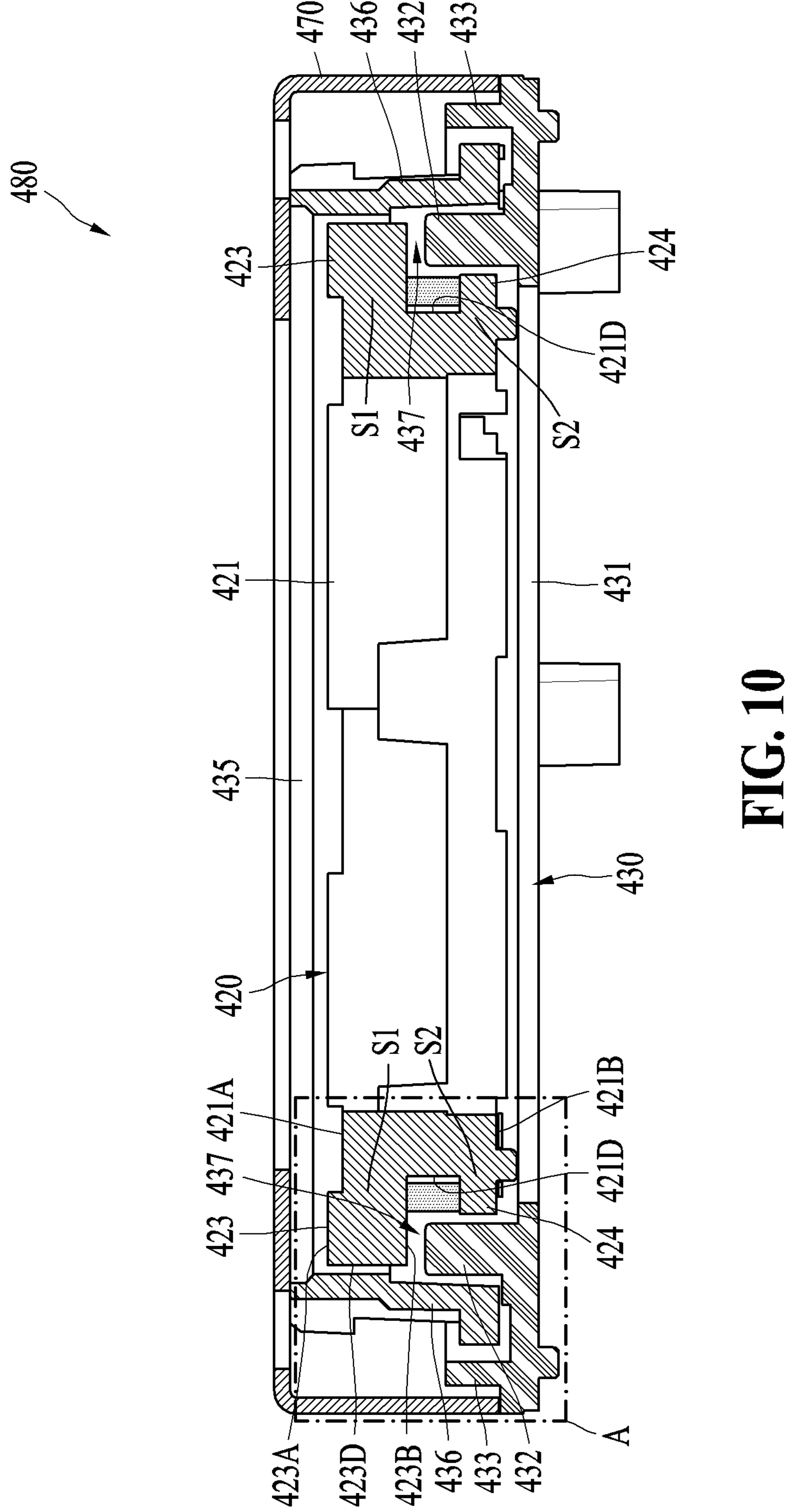
FIG. 10 is a cross-sectional view of the camera module of FIG. 7, taken along a line 10-10 according to an embodiment of the disclosure.

FIG. 10 is a cross-sectional view of the camera module of FIG. 7, taken along a line 10-10 according to an embodiment of the disclosure.

Figure 11:
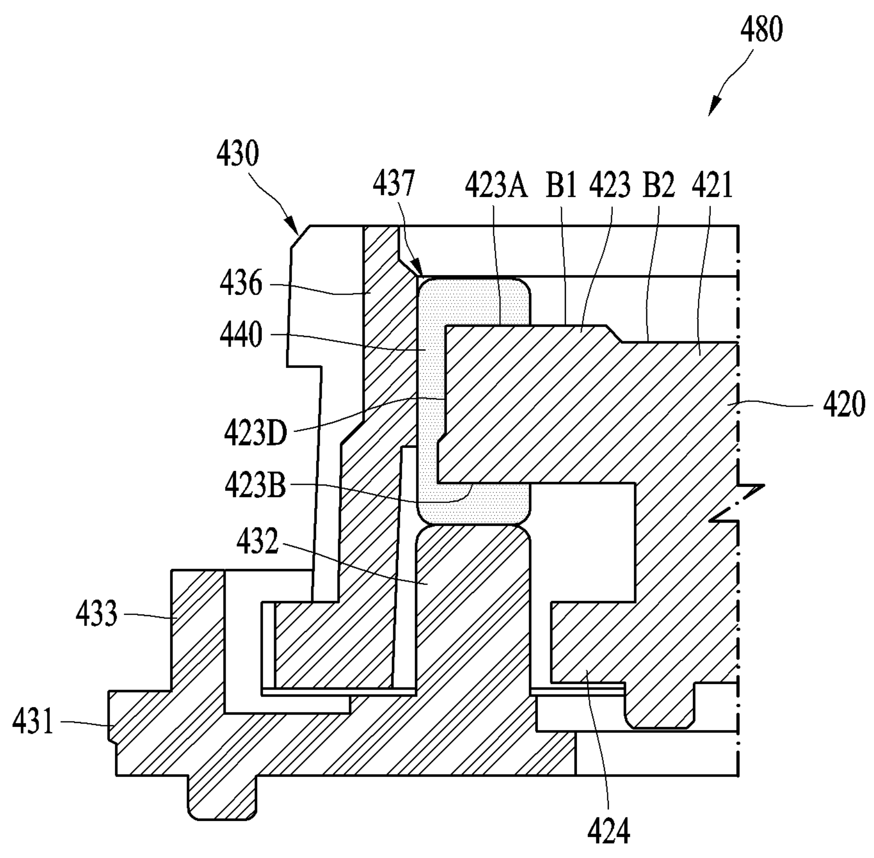
FIG. 11 is an enlarged view of a portion A of the camera module of FIG. 10 according to an embodiment of the disclosure.

FIG. 11 is an enlarged view of a portion A of the camera module of FIG. 10 according to an embodiment of the disclosure.

Figure 12:
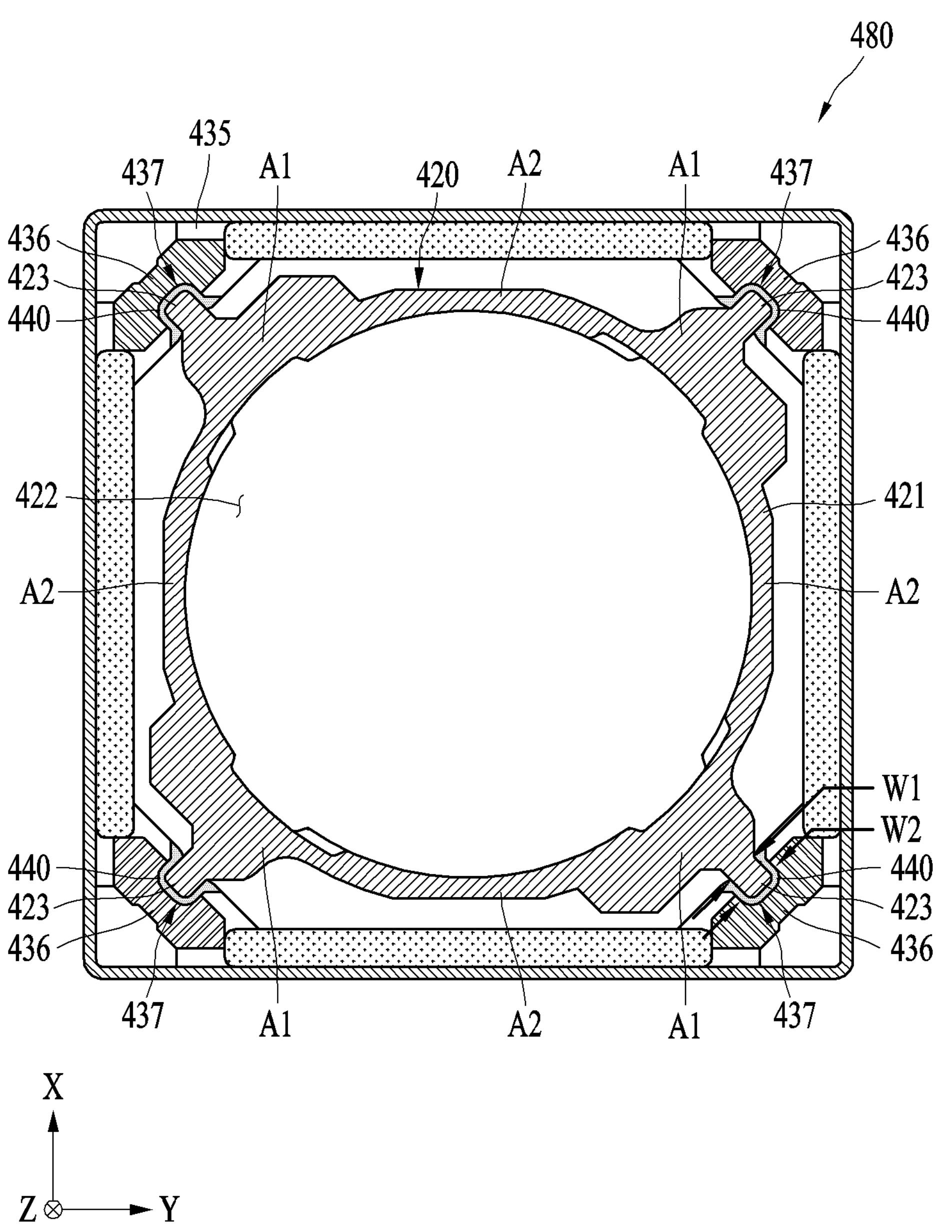
FIG. 12 is a cross-sectional view of the camera module of FIG. 8, taken along a line 12-12 according to an embodiment of the disclosure.

FIG. 12 is a cross-sectional view of the camera module of FIG. 8, taken along a line 12-12 according to an embodiment of the disclosure.

Referring to FIGS. 5 to 12, a camera module 480 (e.g., the camera module 180 of FIG. 1, the camera module 180 of FIG. 2, and/or the first camera module 380A and/or the second camera module 380B of FIGS. 3 and 4) may include a lens assembly 410 (e.g., the lens assembly 210 of FIG. 2). The lens assembly 410 may include at least one lens 411 having an optical axis OA. The optical axis OA may be defined as the axis connecting the center of curvature of a first surface of the at least one lens 411 and the center of curvature of a second surface opposite to the first surface. The lens assembly 410 may include a lens housing 412 configured to accommodate the at least one lens 411. The lens housing 412 may also be referred to as the "lens barrel". Meanwhile, although the lens assembly 410 is not shown in FIGS. 6 to 12, one of ordinary skill in the art would understand that it is omitted for ease and/or clarity of description of the camera module 480.

The camera module 480 may include a first structure 420. The first structure 420 may be referred to as, for example, a "movable portion" that is a portion moving in the camera module 480.

The first structure 420 may include a carrier 421. The carrier 421 may be configured to carry the lens assembly 410. The carrier 421 may be configured to move in a direction according to the optical axis OA (e.g., the +/−Z direction) and/or in a direction substantially orthogonal to the optical axis OA (e.g., the +/−X direction and/or the +/−Y direction). In an embodiment not shown, the first structure 420 may include a plurality of carriers. For example, one carrier may be configured to move in the direction according to the optical axis OA (e.g., the +/−Z direction), and the other carrier may be configured to move in the direction substantially orthogonal to the optical axis OA (e.g., the +/−X direction and/or the +/−Y direction). As another example, the first structure 420 may include a carrier configured to move in the direction according to the optical axis OA (e.g., the +/−Z direction), a carrier configured to move in one direction substantially orthogonal to the optical axis OA (e.g., the +/−X direction), and a carrier configured to move in the other direction substantially orthogonal to the optical axis OA (e.g., the +/−Y direction).

The carrier 421 may include a first carrier surface 421A (e.g., a +Z directional surface), a second carrier surface 421B (e.g., a −Z directional surface) opposite to the first carrier surface 421A, at least one third carrier surface 421C (e.g., an inner side surface) between the first carrier surface 421A and the second carrier surface 421B, and at least one fourth carrier surface 421D (e.g., an outer side surface) opposite to the third carrier surface 421C and between the first carrier surface 421A and the second carrier surface 421B.

The first structure 420 may include a hole 422. The hole 422 may be configured to at least partially accommodate the lens housing 412. The lens housing 412 may be configured to couple to the carrier 421 and/or the hole 422. The hole 422 may be formed between the first carrier surface 421A and the second carrier surface 421B. The hole 422 may be defined by the at least one third carrier surface 421C.

The first structure 420 may include a plurality of extensions 423. The extensions 423 may also be referred to as "protrusions". The extensions 423 may extend away from the fourth carrier surface 421D of the carrier 421. For example, the extensions 423 may extend in a direction substantially orthogonal to the optical axis OA and in a direction away from the optical axis OA.

The plurality of extensions 423 may each include a first surface 423A (e.g., a +Z directional surface), a second surface 423B (e.g., a −Z directional surface) opposite to the first surface 423A and connected to the at least one fourth carrier surface 421D, a pair of third surfaces 423C that are between the first surface 423A and the second surface 423B, opposite to each other, and connected to the at least one fourth carrier surface 421D, and extend or expand away from the at least one fourth carrier surface 421D, and a fourth surface 423D between the first surface 423A and the second surface 423B and between the pair of third surfaces 423C.

At least one area (e.g., a first area B1) of the first surface 423A and the first carrier surface 421A may be on different planes. For example, the first area B1 may be on a surface raised in the +Z direction than the first carrier surface 421A. At least one area (e.g., a second area B2) of the first surface 423A and the first carrier surface 421A may be on substantially the same plane.

The plurality of extensions 423 may be arranged at a plurality of positions of the carrier 421. For example, the plurality of extensions 423 may be arranged at a plurality of corner areas A1 of the carrier 421, respectively, in the circumferential direction of the carrier 421. In the embodiment shown, the number of extensions 423 is "4". In an embodiment not shown, the number of extensions 423 may be "2". In an embodiment not shown, the plurality of extensions 423 may be arranged in a plurality of edge areas A2 of the carrier 421, respectively, if it is possible to secure sufficient space for the arrangement thereof.

The plurality of extensions 423 may be arranged substantially symmetrically with respect to each other. For example, the plurality of extensions 423 may be symmetrical about the central axis of the hole 422 (e.g., substantially aligned with the optical axis OA).

The plurality of extensions 423 may be arranged in a first section S1 (e.g., an upper section) of the at least one fourth carrier surface 421D. The first section S1 may be a section that leads directly to the first carrier surface 421A. In an embodiment not shown, the first section S1 may be a section adjacent to the first carrier surface 421A but offset from the first carrier surface 421A.

The plurality of extensions 423 and the carrier 421 may be formed monolithically. For example, the carrier 421 and the plurality of extensions 423 may be formed by a single injection molding. In an embodiment not shown, the plurality of extensions 423 may be components separate from the carrier 421 and be coupled to the carrier 421.

The material of at least one extension 423 of the plurality of extensions 423 may be different from the material of the carrier 421. For example, the carrier 421 may include a non-metallic material (e.g., plastic), and the at least one extension 423 may include a metallic material. The material of at least one extension 423 of the plurality of extensions 423 may be the same as the material of the carrier 421.

The first structure 420 may include a base 424. The base 424 may extend or protrude away from the at least one fourth carrier surface 421D. The extending length or protruding length of the base 424 may be less than the extending length or protruding length of the extensions 423. The base 424 may be positioned to be separate from the plurality of extensions 423 (e.g., to be spaced apart from the second surface 423B) in the height direction of the carrier 421 (e.g., the Z direction) that is defined as a direction from the second carrier surface 421B to the first carrier surface 421A. The base 424 may extend wholly or partially in the circumferential direction of the carrier 421. The base 424 may be positioned in a second section S2 (e.g., a lower section) of the at least one fourth carrier surface 421D. The second section S2 may differ at least in part from the first section S1. The second section S2 may be a section that leads directly to the second carrier surface 421B. In an embodiment not shown, the second section S2 may be a section adjacent to the second carrier surface 421B but offset from the second carrier surface 421B.

The camera module 480 may include a second structure 430. The second structure 430 may be referred to as, for example, a "fixing portion", which is a portion of the camera module 480 that fixes at least one component, or as, for example, a "stationary portion," which is a substantially immobile portion of the camera module 480.

The second structure 430 may include a base frame 431. The base frame 431 may be configured to support the carrier 421. The base frame 431 may include a shape that forms a hole and extends in the perimeter direction.

The base frame 431 may include a plurality of columns 432. The plurality of columns 432 may protrude in one direction (e.g., the +Z direction) from the base frame 431. The plurality of columns 432 may be arranged at corner areas of the base frame 431, respectively. The base frame 431 may include at least one wall 433. The at least one wall 433 may extend in the perimeter direction of the base frame 431. The at least one wall 433 may be arranged in at least a portion of the edge areas of the base frame 431 and/or at least a portion of the corner areas of the base frame 431.

The second structure 430 may include a cover frame 435. The cover frame 435 may be configured to couple to the base frame 431. The base frame 431 and the cover frame 435 may define the boundary that limits the range in which the first structure 420 may move. The cover frame 435 may include a shape that forms a hole and extends in the perimeter direction.

At least a partial area of the first structure 420 and at least a partial area of the second structure 430 may form a gap. For example, the corner areas of the carrier 421 and the corresponding corner areas of the cover frame 435 may be spaced apart from each other with a gap therebetween. In an embodiment not shown, the edge areas of the carrier 421 and the corresponding edge areas of the cover frame 435 may be spaced apart from each other with a gap therebetween, if separate components (e.g., a first electromagnetic element 451 and/or a second electromagnetic element 452) are not arranged therebetween.

The cover frame 435 may include a plurality of legs 436. The plurality of legs 436 may be configured to engage with the at least one wall 433 arranged in the corner areas of the base frame 431. For example, the plurality of legs 436 may be configured to engage with the inside of the at least one wall 433. The plurality of legs 436 may protrude in one direction (e.g., the −Z direction) from the cover frame 435. The plurality of legs 436 may be arranged at the corner areas of the cover frame 435, respectively.

The cover frame 435 may include a plurality of guide tunnels 437. The plurality of guide tunnels 437 may each be configured to guide one corresponding extension 423 in a predetermined direction (e.g., the +/−Z direction). The plurality of guide tunnels 437 may each at least partially accommodate one corresponding extension 423. At least a portion of the pair of third surfaces 423C and the fourth surface 423D of an extension 423 may face a guide tunnel 437. At least a portion of the pair of third surfaces 423C and the fourth surface 423D of an extension 423 may be offset from a guide tunnel 437 with a gap therebetween. The plurality of guide tunnels 437 may each have a width W2 substantially equal to or greater than the width W1 of the one corresponding extension 423.

The plurality of guide tunnels 437 may each include a curved groove formed on an inner side surface of one corresponding leg 436. For example, the groove may include a substantially "U"-shaped curve. The plurality of guide tunnels 437 may each extend between one side (e.g., +Z directional side) and the opposite side (e.g., the −Z directional side) of one corresponding leg 436.

The plurality of guide tunnels 437 may be arranged in the plurality of legs 436 arranged in the corner areas of the cover frame 435, respectively. In an embodiment not shown, the plurality of guide tunnels 437 may be arranged in the edge areas of the cover frame 435, respectively, if it is possible to secure sufficient space for the arrangement of the plurality of extensions 423.

The guide tunnels 437 may be configured to accommodate at least a portion of the columns 432. An extension 423 may be limited to moving between one surface (e.g., the −Z directional surface) of the cover frame 435 and one surface (e.g., the +Z directional surface) of a column 432. In an embodiment not shown, if a column 432 is absent, an extension 423 may be limited to moving between one surface (e.g., the −Z directional surface) of the cover frame 435 and one surface (e.g., the +Z directional surface) of the base frame 431.

The camera module 480 may include a plurality of dampers 440. The dampers 440 may be configured to damp the extensions 423 moving in a predetermined direction (e.g., the +/−Z direction). This may impede unwanted movement of the first structure 420 (e.g., movement in the +/−Z direction), and thereby reduce or prevent an unwanted predetermined operation (e.g., autofocus operation) of the lens 411 in a direction along the optical axis OA (e.g., the +/−Z direction).

The dampers 440 may at least partially surround the extensions 423. For example, a damper 440 may contact at least a portion of the first surface 423A of an extension 423 (e.g., at least a portion of the first area B1), at least a portion of the second surface 423B, at least a portion of the pair of third surfaces 423C, and the fourth surface 423D.

The dampers 440 may be arranged in the guide tunnels 437. A damper 440 may be positioned between one surface (e.g., the −Z directional surface) of the cover frame 435 and one surface (e.g., the +Z directional surface) of a column 432. In an embodiment not shown, if a column 432 is absent, a damper 440 may be positioned one surface (e.g., the −Z directional surface) of the cover frame 435 and one surface (e.g., the +Z directional surface) of the base frame 431. A damper 440 may not be positioned substantially outside of a guide tunnel 437.

The dampers 440 may be at least partially filled in the guide tunnels 437. The dampers 440 may be filled across the entire width of the guide tunnels 437. A damper 440 may be filled substantially in the entire space between one surface (e.g., the −Z directional surface) of the cover frame 435 and one surface (e.g., the +Z directional surface) of a column 432. In an embodiment not shown, if a column 432 is absent, a damper 440 may be filled substantially in the entire space between one surface (e.g., the −Z directional surface) of the cover frame 435 and one surface (e.g., the +Z directional surface) of the base frame 431.

The dampers 440 may include a cured damping material. For example, the damping material may be cured to a predetermined form by UV curing, thermal curing, and/or any other suitable method. The cured damping material may allow the extensions 423 to move to predetermined positions within the dampers 440 and then substantially return to initial positions. For example, the damping material may include a liquid mixture of silicone-based resins (e.g., silicone gel), and may include a variety of one or more materials as long as the desired damping performance is achieved.

The camera module 480 may include an actuator 450. The actuator 450 may be configured to move the first structure 420 in a predetermined direction (e.g., the +/−X direction, the +/−Y direction, and/or the +/−Z direction) relative to the second structure 430. For example, the actuator 450 may include at least one first electromagnetic element 451 and a plurality of second electromagnetic elements 452 configured to electromagnetically couple to the at least one first electromagnetic element 451. Any one of the first electromagnetic element 451 and the second electromagnetic elements 452 may include a coil, and the other one may include a magnet. The first electromagnetic element 451 may be positioned on the fourth carrier surface 421D. The first electromagnetic element 451 may extend in the circumferential direction of the carrier 421. The first electromagnetic element 451 may be positioned on the base 424. The plurality of second electromagnetic elements 452 may be positioned on the edge areas of the base frame 431, respectively. In an embodiment not shown, the actuator 450 may include a suspension wire, a shape-memory alloy (SMA) actuator, at least one ball, at least one bearing, and/or any other suitable actuator.

The camera module 480 may include an elastic body 460. The elastic body 460 may be configured to elastically support the first structure 420 and/or the second structure 430. For example, the elastic body 460 may include a first elastic body 461 positioned on the carrier 421. The elastic body 460 may include a second elastic body 462 positioned under the carrier 421.

The camera module 480 may include a camera cover 470. The camera cover 470 may also be referred to as a "shield can". The camera cover 470 may be configured to at least partially cover the lens assembly 410, the first structure 420, the second structure 430, the dampers 440, the actuator 450, and/or the elastic body 460. The base frame 431 and the camera cover 470 may form a space for accommodating at least one camera-related component.

Figure 13:
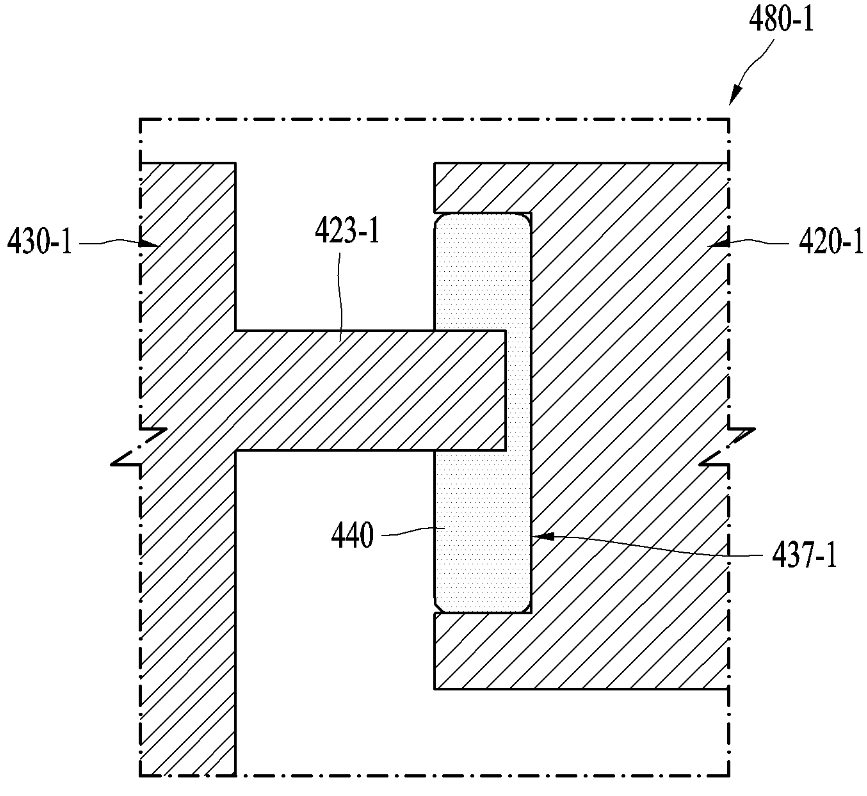
FIG. 13 is a view illustrating a camera module according to an embodiment of the disclosure.

FIG. 13 is a view illustrating a camera module according to an embodiment of the disclosure.

Referring to FIG. 13, a camera module 480-1 (e.g., the camera module 180 of FIG. 1, the camera module 180 of FIG. 2, the first camera module 380A and/or the second camera module 380B of FIGS. 3 and 4, and/or the camera module 480 of FIGS. 5 to 12) may include a first structure 420-1 (e.g., the first structure 420 of FIGS. 5 to 12), a second structure 430-1 (e.g., the second structure 430 of FIGS. 5 to 12), and a damper 440. The first structure 420-1 may include a guide tunnel 437-1 (e.g., the guide tunnels 437 of FIGS. 5 to 12). The damper 440 may be positioned in the guide tunnel 437-1. The second structure 430-1 may include an extension 423-1 (e.g., the extensions 423). The extension 423-1 may extend from the second structure 430-1 toward the first structure 420-1. The damper 440 may damp the first structure 420-1 while the first structure 420-1 moves (e.g., moves in a direction according to the optical axis OA of FIGS. 5 to 12) relative to the second structure 430-1.

One aspect of the disclosure may provide a camera module for impeding unwanted movement of a lens in an optical axis direction by an external impact and an electronic device including the same.

A camera module 180; 380A, 380B; 480; 480-1 may include a lens 411 having an optical axis OA. The camera module 180; 380A, 380B; 480; 480-1 may include a first structure 420; 420-1 configured to carry the lens 411 along the optical axis OA. The camera module 180; 380A, 380B; 480; 480-1 may include a second structure 430; 430-1. The first structure 420; 420-1 may be configured to move relative to the second structure 430; 430-1. The camera module 180; 380A, 380B; 480; 480-1 may include an extension 423; 423-1 extending from any one of the first structure 420; 420-1 or the second structure 430; 430-1. The camera module 180; 380A, 380B; 480; 480-1 may include a guide tunnel 437; 437-1 positioned in the other one of the first structure 420; 420-1 or the second structure 430; 430-1 and configured to guide the extension 423; 423-1. The camera module 180; 380A, 380B; 480; 480-1 may include a damper 440 configured to damp a movement of the extension 423; 423-1 in a direction of the optical axis OA.

The damper 440 may be configured to damp the extension 423; 423-1 moving relative to the guide tunnel 437; 437-1 in a direction according to the optical axis OA.

The damper 440 may surround the extension 423; 423-1.

The damper 440 may be positioned in the guide tunnel 437; 437-1.

The damper 440 may include a cured damping material.

The damper 440 may fill the guide tunnel 437; 437-1.

The extension 423; 423-1 may extend in a direction substantially orthogonal to the optical axis OA.

The extension 423; 423-1 may be positioned in a corner area A1 of the any one of the first structure 420; 420-1 and the second structure 430; 430-1.

The extension 423; 423-1 may include a material different from the material of the any one of the first structure 420; 420-1 and the second structure 430; 430-1.

The extension 423; 423-1 and the any one of the first structure 420; 420-1 and the second structure 430; 430-1 may be formed monolithically.

A width W1 of the extension 423; 423-1 may be substantially equal to or less than a width W2 of the guide tunnel 437; 437-1.

The guide tunnel 437; 437-1 may include a curved surface.

The guide tunnel 437; 437-1 may be positioned in a corner area of the other one of the first structure 420; 420-1 and the second structure 430; 430-1.

The any one of the first structure 420; 420-1 and the second structure 430; 430-1 may be configured to move in at least one of the direction according to the optical axis OA and the direction substantially orthogonal to the optical axis OA.

The corner area A1 of the first structure 420; 420-1 and the corner area of the second structure 430; 430-1 may be spaced apart from each other to form a gap.

The any one of the first structure 420; 420-1 and the second structure 430; 430-1 may include a base frame 431 configured to support the other one structure. The any one of the first structure 420; 420-1 and the second structure 430; 430-1 may include a cover frame 435 configured to cover the other one structure.

The camera module 180; 380A, 380B; 480; 480-1 may include a first electromagnetic element 451 positioned in any one of the first structure 420; 420-1 and the second structure 430; 430-1. The camera module 180; 380A, 380B; 480; 480-1 may include a second electromagnetic element 452 positioned in the other one of the first structure 420; 420-1 and the second structure 430; 430-1 and configured to couple to the first electromagnetic element.

The camera module 180; 380A, 380B; 480; 480-1 may include an elastic body 460 configured to elastically support at least one of the first structure 420; 420-1 and the second structure 430; 430-1.

The camera module 180; 380A, 380B; 480; 480-1 may include a camera cover 470 configured to cover the first structure 420; 420-1 and the second structure 430; 430-1.

An electronic device 101; 301 may include a camera module 180; 380A, 380B; 480; 480-1.

According to an embodiment, it is possible to mitigate the movement of a lens caused by an external impact and stabilize the image quality. The effects of the camera module and the electronic device including the same according to an embodiment may not be limited to the above-mentioned effects, and other unmentioned effects may be clearly understood from the following description by one of ordinary skill in the art.

The embodiments of the disclosure are intended to be illustrative and not restrictive. Various modifications may be made to the detailed description of the disclosure including the accompanying scope of claims and equivalents. Any of the embodiment(s) described herein may be used in combination with any other embodiment(s) described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module, comprising:
a lens having an optical axis;
a first structure configured to carry the lens along the optical axis and comprising a carrier, wherein the carrier comprises:
a top carrier surface;
a bottom carrier surface opposite the top carrier surface;
an inner side carrier surface between the top carrier surface and the bottom carrier surface; and
an outer side carrier surface opposite the inner side carrier surface and between the top carrier surface and the bottom carrier surface;
a second structure, wherein the first structure is configured to move relative to the second structure;
an extension extending from the first structure, wherein the extension comprises:
a top surface;
a bottom surface opposite the top surface and connected to the outer side carrier surface; and
a side surface between the top surface and the bottom surface,
wherein the top surface of the extension comprises:
a first area raised in a direction along the optical axis than the top carrier surface; and
a second area substantially coplanar with the top carrier surface;
a guide tunnel positioned in the second structure and configured to guide the extension; and
a damper configured to damp a movement of the extension in a direction of the optical axis.

2. The camera module of claim 1, wherein the damper is configured to damp the extension moving relative to the guide tunnel in a direction according to the optical axis.

3. The camera module of claim 1, wherein the damper surrounds the extension.

4. The camera module of claim 1, wherein the damper is positioned in the guide tunnel.

5. The camera module of claim 1, wherein the damper comprises a cured damping material.

6. The camera module of claim 1, wherein the damper fills the guide tunnel.

7. The camera module of claim 1, wherein the extension extends in a direction substantially orthogonal to the optical axis.

8. The camera module of claim 1, wherein the extension is positioned in a corner area of the first structure.

9. The camera module of claim 1, wherein the extension comprises a material different from the material of the first structure.

10. The camera module of claim 1, wherein the extension and the first structure are formed monolithically.

11. The camera module of claim 1, wherein a first width (W1) of the extension is substantially equal to or less than a second width (W2) of the guide tunnel.

12. The camera module of claim 1, wherein the guide tunnel comprises a curved surface.

13. The camera module of claim 1, wherein the guide tunnel is positioned in a corner area of the second structure.

14. The camera module of claim 1, wherein the first structure is configured to move in at least one of the direction according to the optical axis and the direction substantially orthogonal to the optical axis.

15. The camera module of claim 1, wherein a corner area of the first structure and a corner area of the second structure are spaced apart from each other to form a gap.

16. The camera module of claim 1, wherein the second structure comprises:

a base frame configured to support the first structure; and a cover frame configured to cover the first structure.

17. The camera module of claim 1, further comprising:

a first electromagnetic element positioned in the first structure; and a second electromagnetic element positioned in the second structure and configured to couple to the first electromagnetic element.

18. The camera module of claim 1, further comprising:

an elastic body configured to elastically support at least one of the first structure and the second structure.

19. The camera module of claim 1, further comprising:

a camera cover configured to cover the first structure and the second structure.

20. An electronic device comprising:

a camera module, wherein the camera module includes:

a lens having an optical axis, a first structure configured to carry the lens along the optical axis and comprising a carrier, wherein the carrier comprises:

a top carrier surface;

a bottom carrier surface opposite the top carrier surface;

an inner side carrier surface between the top carrier surface and the bottom carrier surface; and an outer side carrier surface opposite the inner side carrier surface and between the top carrier surface and the bottom carrier surface, a second structure, wherein the first structure is configured to move relative to the second structure, an extension extending from the first structure, wherein the extension comprises:

a top surface;

a bottom surface opposite the top surface and connected to the outer side carrier surface; and a side surface between the top surface and the bottom surface, wherein the top surface of the extension comprises:

a first area raised in a direction along the optical axis than the top carrier surface; and a second area substantially coplanar with the top carrier surface, a guide tunnel positioned in the second structure and configured to guide the extension, and a damper configured to damp a movement of the extension in a direction of the optical axis.

* * * * *